(12) United States Patent
Wang et al.

(10) Patent No.: US 10,551,492 B2
(45) Date of Patent: Feb. 4, 2020

(54) DETECTING RAIN INTENSITY WITH TRAFFICE RADAR

(71) Applicant: MS Sedco, Inc., Indianapolis, IN (US)

(72) Inventors: Wei Wang, Zionsville, IN (US); Jessica L. Myers, Carmel, IN (US); Leroy S. Wignot, Carmel, IN (US)

(73) Assignee: MS Sedco, Inc., Indianapolis, IN (US)

( * ) Notice: Subject to any disclaimer, the term of this patent is extended or adjusted under 35 U.S.C. 154(b) by 313 days.

(21) Appl. No.: 15/499,414

(22) Filed: Apr. 27, 2017

(65) Prior Publication Data

US 2017/0315230 A1    Nov. 2, 2017

Related U.S. Application Data

(60) Provisional application No. 62/328,329, filed on Apr. 27, 2016.

(51) Int. Cl.
*G01S 13/91* (2006.01)
*G01S 13/95* (2006.01)

(52) U.S. Cl.
CPC ............ *G01S 13/91* (2013.01); *G01S 13/951* (2013.01)

(58) Field of Classification Search
CPC ........ G01S 13/91; G01S 13/951; G01S 7/412; G08G 1/07; Y02A 90/18
USPC ......................................................... 342/26
See application file for complete search history.

(56) References Cited

U.S. PATENT DOCUMENTS

| | | | |
|---|---|---|---|
| 2006/0055354 A1* | 3/2006 | Hirose | B60S 1/0818 318/444 |
| 2010/0309041 A1* | 12/2010 | Hassen | G01S 7/411 342/26 R |
| 2012/0038490 A1* | 2/2012 | Verfuerth | H05B 37/0272 340/910 |
| 2013/0300583 A1* | 11/2013 | Wignot | G01S 13/91 340/907 |
| 2016/0370500 A1* | 12/2016 | Sabourin | G01W 1/14 |
| 2017/0001601 A1* | 1/2017 | Lee | B60S 1/0837 |

* cited by examiner

*Primary Examiner* — Timothy X Pham
(74) *Attorney, Agent, or Firm* — Michael A. Pugel

(57) ABSTRACT

A radar camera of a signalized traffic control system determines rain intensity, compares it to a threshold, then adjusts traffic signal operation. Rain intensity of a level relative to the threshold causes the traffic control system to operate in a rain intensity mode. The rain intensity mode has the system hold a call to a traffic light controller during the time when rain intensity is above the threshold. The traffic control system includes a radar camera, traffic controller, a computer with memory, and program instructions. A manner of operation includes sampling camera radar, counting the number of raindrops and raindrop size within a predetermined range, determining rain intensity using the measured raindrop parameters/characteristics, comparing the determined rain intensity with a rain intensity threshold, and operating the traffic controller accordingly while the rain intensity is above the threshold.

20 Claims, 4 Drawing Sheets

DETECTING RAIN INTENSITY WITH TRAFFICE RADAR

CROSS-REFERENCE TO RELATED APPLICATIONS

This U.S. non-provisional patent application claims the benefit of and/or priority under 35 U.S.C. § 119(e) to U.S. provisional patent application Ser. No. 62/328,329 filed Apr. 27, 2016 titled "Detecting Rain Intensity With Traffic Radar," the entire contents of which is specifically incorporated herein by reference.

FIELD OF THE INVENTION

The present invention relates to the field of signalized traffic control systems having radar cameras to sense when a vehicle approaches a predetermined area and then instructs the traffic controller accordingly.

BACKGROUND OF THE INVENTION

Signalized traffic control systems are used in many locations to aid in traffic management at intersections and otherwise. Such systems have cameras for traffic detection. These cameras typically use radar of microwave frequencies for operation. However, there are numerous conditions where detection is not possible with radar cameras. In view of this, means have been devised to detect these conditions via video and give a call to the traffic light controller for detection during these adverse periods. One such event is heavy rain.

Unfortunately, radar using microwave frequencies have the characteristic that range is reduced as rain intensity increases. Normally this is only for very heavy rain, i.e. rainfall greater than two (2) inches/hour or more, but can be a serious problem when rain is much greater than 2 inches/hour or when no reduction in range is allowed.

It is therefore an object of the present invention to provide a system, device and/or method for detecting rain intensity with traffic radar. It is also an object of the present invention to provide a signalized traffic control system having a radar camera that can detect rain intensity. It is further an object of the present invention to provide a signalized traffic control system having a radar camera that can detect rain intensity and adjust traffic signal operation accordingly.

SUMMARY OF THE INVENTION

The present invention is a traffic control system, device, and method that detects rain intensity with traffic radar, especially, but not necessarily, in or with respect to a signalized traffic control system.

The traffic control system uses its own traffic radar camera and programmed computing device to detect rain intensity, then adjust or modify traffic light operation accordingly. In one form, detected rain intensity is compared to a rain intensity threshold. If the detected rain intensity is a particular level relative to the rain intensity threshold, the system will operate the signalized traffic control system in a rain intensity detected mode. In one form, the rain intensity detected mode has the system hold a call to a traffic light controller during the time when rain intensity is determined to be a value relative to the rain intensity threshold (e.g. above the rain intensity threshold).

The traffic control system includes a radar camera, traffic controller, and a programmed computing device (e.g. computer) with memory, the programming (program instructions) in accordance with the principles of the present invention. The computing device with memory and program instructions may or may not be incorporated into the traffic controller.

The method includes one or more of the steps of sampling radar from the camera, measuring characteristics of raindrops (e.g. the number of raindrops, the size of the raindrops, and raindrop reflection) within a predetermined range or area (a raindrop intensity range or area) from the radar camera, calculating rain intensity using the measured, detected or determined characteristics of the raindrops, determining an equivalent radar cross section, determining rain intensity, comparing the determined rain intensity with a rain intensity threshold, and, holding notification ("call") to the traffic controller while the rain intensity is above the threshold. The traffic control system may also hold the call for an additional period of time (e.g. 5 seconds) after the rain intensity has diminished below the threshold.

The method may include determining an average rain intensity using rain intensity over a given number of rain intensity calculations. This may include calculating a rain intensity factor using the average number of raindrops and an equivalent radar cross section.

Further aspects of the present invention will become apparent from consideration of the drawings and the following description a form of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features of the invention will be better understood by reference to the accompanying drawings which illustrate a form of the present invention, wherein.

DETAILED DESCRIPTION OF THE INVENTION

Figure 1:
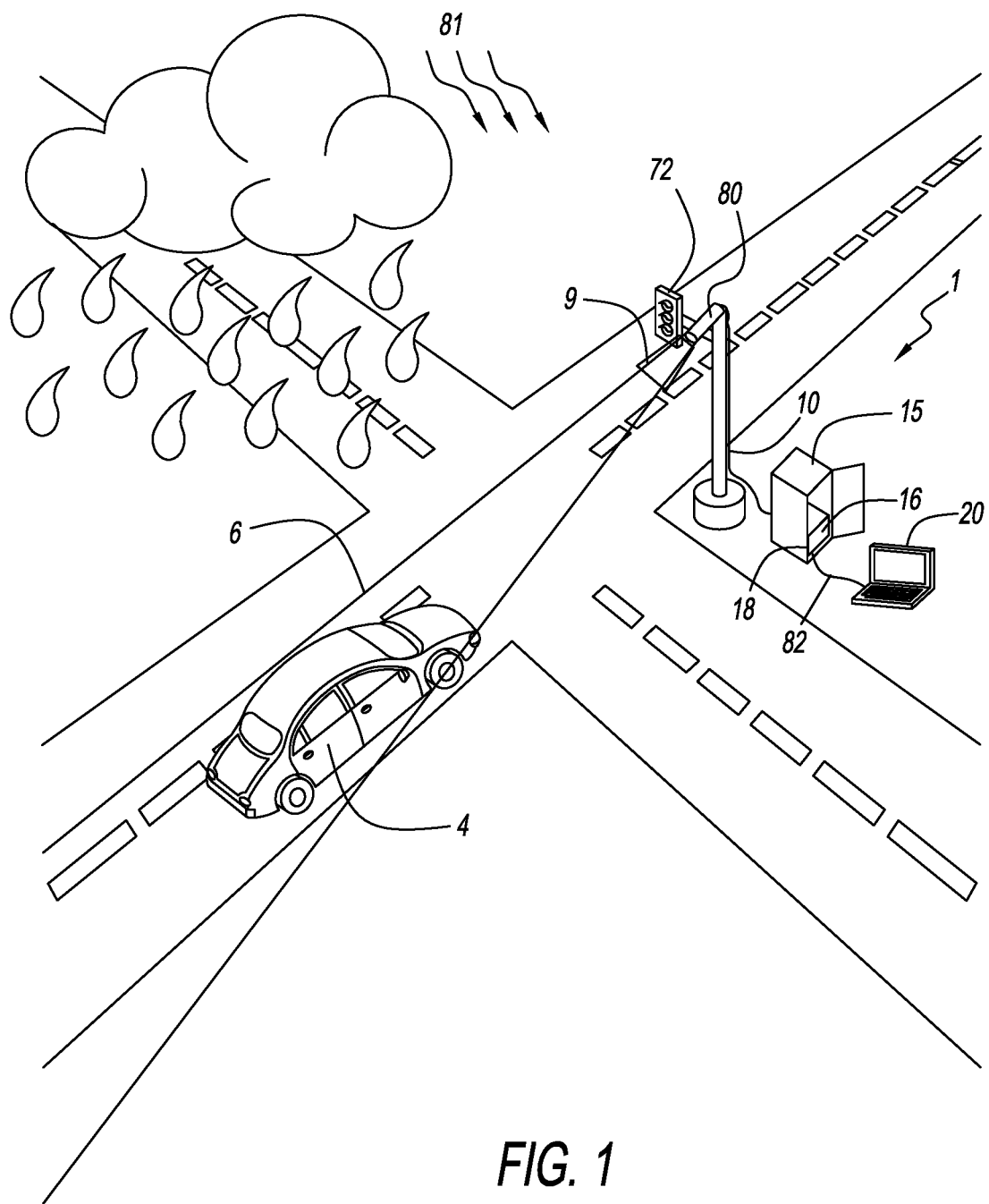
FIG. 1 is an exemplary diagram of a signalized traffic control system of the present invention.

FIG. 1 shows an exemplary traffic control system 1 using a traffic light or signal 72 (a "signalized traffic control system"). The traffic control system 1 shows an intersection or crossing of two streets with a single traffic light or signal 72, it being understood that the present invention is applicable to other types of intersections, T's, roundabouts, and/or the like having one or more traffic lights/signals.

The traffic control system 1 includes a radar camera 80 connected to a traffic controller 16 contained within an enclosure 18 via a connection 10. The radar camera 80 may be wirelessly connected to the traffic controller 16 if desired. The traffic controller 16 is connected via wire 82 to a computer/computing device 20 having memory for storing program instructions, programming, operating instructions and the like, as well as other typical electronic components of a computer/computing device. The traffic controller 16 may be wirelessly connected to the computer/computing device 20 if desired. The traffic controller 16 is also connected to the traffic light/signal 72 via wire or wirelessly.

The radar camera 80 and/or the computer/computing device 20 are/is configured to monitor a field of view 6 that includes a portion of the road and a stop bar area. The field of view 6 may be adjusted as desired to cover a particular distance/area size. In accordance with the present invention, the radar camera 80 and/or the computer/computing device 20 further provides a rain intensity detection/measurement area/field of view 9 for detecting rain intensity 81. The size of the area and distance covered by the detection/measurement area/field of view 9 may be chosen as desired.

A vehicle 4 is shown coming into the stop bar area being monitored by the radar camera 80 field of view 6. The radar detects the vehicle 4 and sends a message to the traffic controller 16. The traffic controller activates the green light on the traffic light/signal 72. The rain intensity detection/measurement area 9 is adjustable in distance from the radar camera 80. A typical value of measurement is ten feet (10'). Parameters or characteristics are derived from this radar measurement and used by the present invention, parameters/characteristics such as, but not limited to, raindrop count, raindrop size, size of raindrop reflection, and radar cross section of each raindrop.

During heavy rain 81 the radar signal is attenuated and it becomes critical to ascertain when the intensity is at a level which will disrupt the detection of vehicles as they pull into the stop bar/detection area 6 or any other area where detection is desired. If the rain intensity detection is too sensitive the intersection loses efficiency. If the rain intensity detection is not quick enough then you risk vehicles being left stranded.

Rainfall intensity may be classified as described in Met Office (August 2007), "Fact Sheet No. 3: Water in the Atmosphere" and such may be used in the present invention. Other systems may be used. From the system, rain intensity may be classified as:

Slight (Light) rain—when the precipitation rate is <2 mm (0.079 in) per hour.

Moderate (Medium) rain—when the precipitation rate is between 2 mm (0.079 in) to 10 mm (0.39 in) per hour.

Heavy rain—when the precipitation rate is between 10 mm (0.39 in) and 50 mm (2.0 in) per hour.

Violent rain (Tropical Downpour)—when the precipitation rate is >50 mm (2.0 in) per hour.

Figure 2:
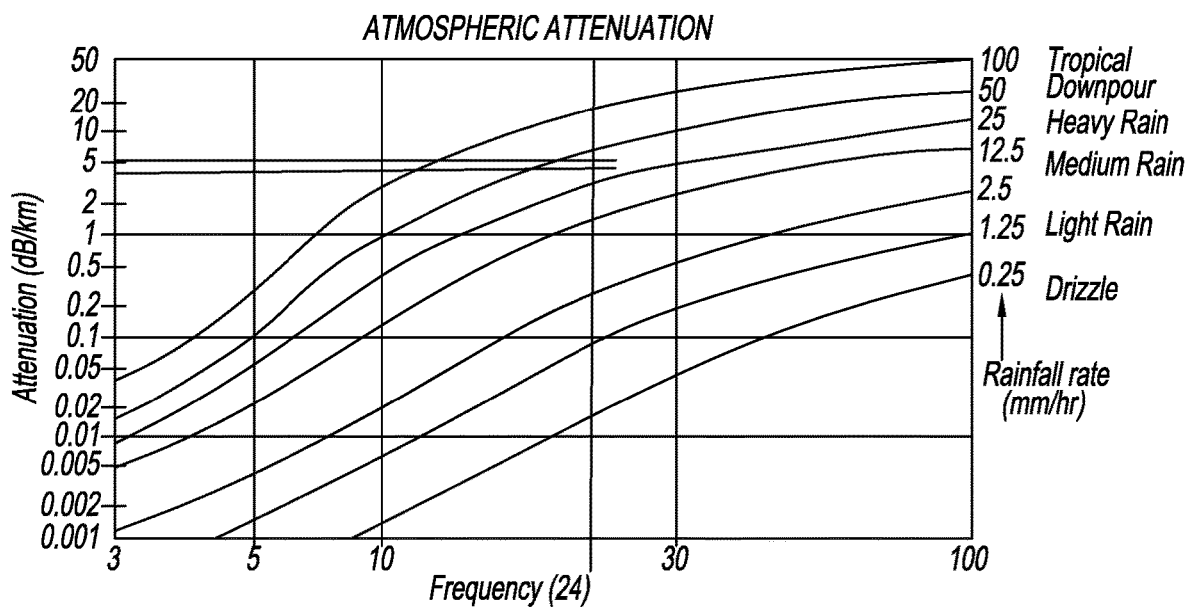
FIG. 2 is a graph of rain intensity vs. attenuation vs. frequency.
Figure 3:
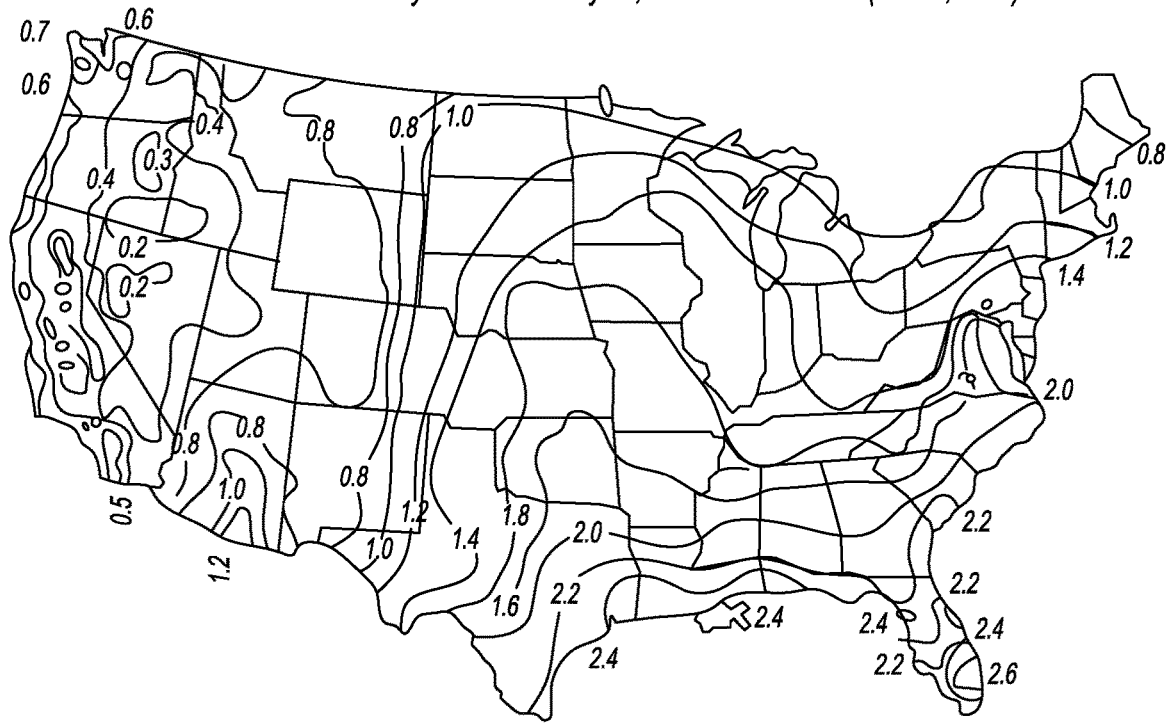
FIG. 3 is a diagram of U.S. rainfall intensity in inch/hour for a 2 year, 1 hour storm event.

Microwave (radar) attenuation in dB can be characterized by rain intensity over frequency as shown in the graph of FIG. 2. This or similar information is preferably, but not necessarily, used in determining rain intensity per the present invention. The graph shows that violent rain/tropical downpour rainfall rates of greater than 2 inches/hour can cause significant attenuation at the frequency of interest, 24 GHz. Thus, the effectiveness of radar cameras is diminished. The map of FIG. 3 shows that there are many areas in the United States where violent rain/tropical downpour situations occur. Thus, during these times, the operation of the traffic control system may be compromised.

A radar range calculation is:

$$\text{Range} = \sqrt[4]{\frac{P_r * \sigma * c^2 * G_r^2}{(4\pi)^3 * f_o^2 * P_{min}}}$$

where: Radar Output Power is from the radar head product spec.

Antenna Gain and Minimum Detectable Signal were adjusted to give correct range.

Frequency is given.

Radar Cross Section came from the link and table on the previous page.

The table below summarizes radar degradation in worst case scenarios. The range utilized in the table below is based on the vehicle being a car. The range without rain attenuation is 600 feet:

| Rain Level | Range with Rain | Range reduction |
| --- | --- | --- |
| 4 inches/hour | 302 | 298 |
| ~3 inches/hour | 351 | 249 |
| ~2.3 inches/hour | 451 | 149 |

Based on these calculations stop bar detection should remain functional through heavy rain conditions. There are situations where there is a need to be able to detect throughout the entire 600 feet range. In these situations, the radar detects the rain intensity and places a call to the traffic controller during the period that rain intensity is above the threshold.

Figure 4:
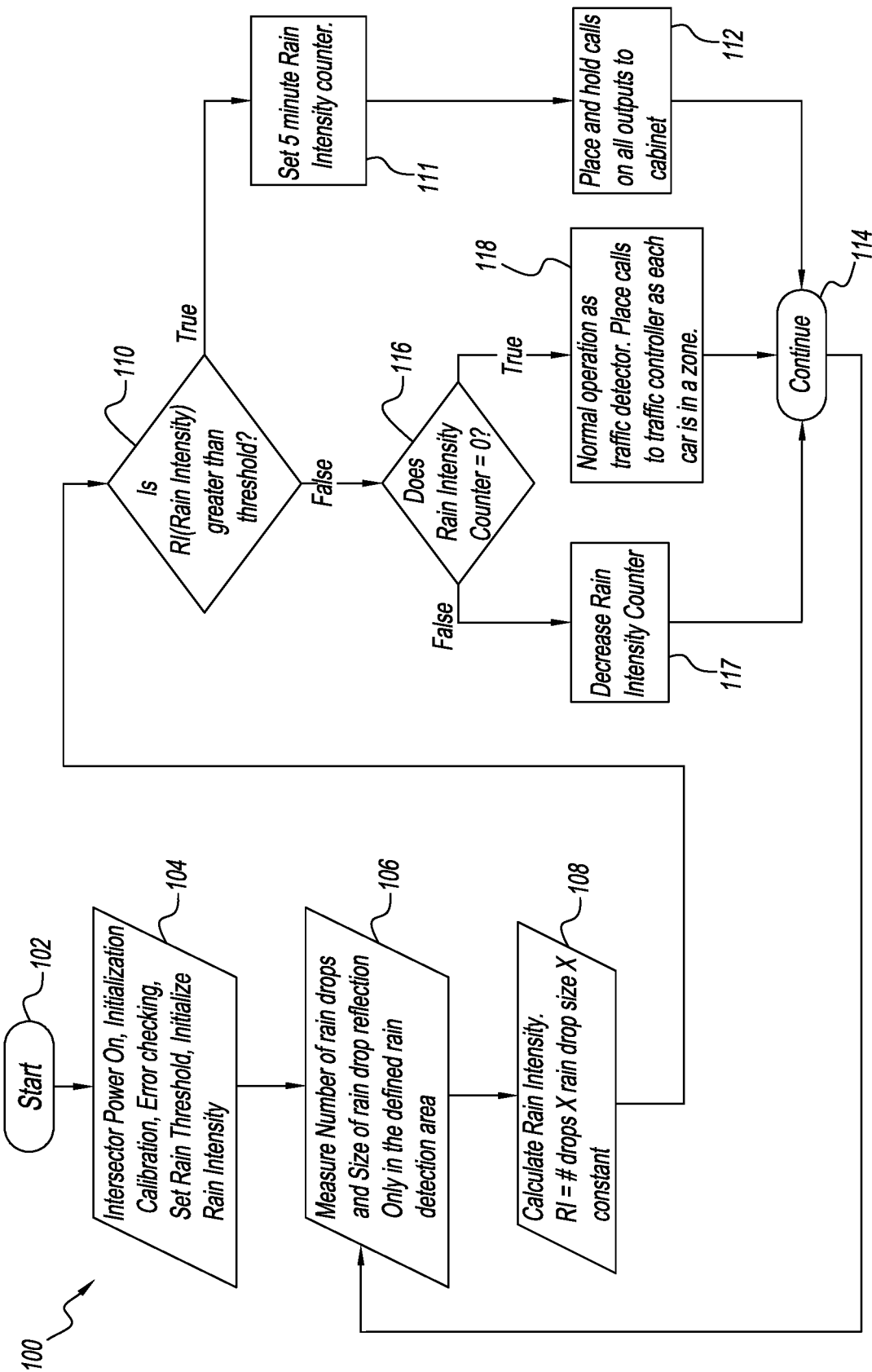
FIG. 4 is a flow chart of a manner of operation of the present signalized traffic control system with rain intensity determination using the radar camera of the signalized traffic control system in accordance with the principles of the present invention.

A signalized traffic control system may thus include rain intensity detection/determination per the principles of the present invention, in its traffic signal (light) operation. One method is presented in the flowchart 100 of FIG. 4. The signalized traffic control system turns on with a Start 102. After Start 102, the Intersector (system) programming powers on, initializes, calibrates, error checks, sets a rain threshold, and initializes rain intensity programming 106. Thereafter, the radar camera is used to obtain measurement or data of the number of raindrops and raindrop size (via reflection) in order to calculate rain intensity (RI) by the formula RI=(# of raindrops)×(raindrop size)×(constant) 108.

The rain intensity is then compared to a rain intensity threshold (threshold) 110. If the rain intensity is greater than the threshold (True), then a rain intensity counter (counter) of a given interval (e.g. 5 minutes) is set 111. The calls on all outputs of the cabinet (traffic controller) are then placed and held. Thereafter the system continues 114 which waits for a rain event (or the continuation of the rain event) and takes rain measurements 106. If the rain intensity is not greater than the threshold (False) the system determines if the rain intensity counter is zero (0) 116. If the rain intensity counter is not equal to zero (False), the rain intensity counter is decreased 117. Thereafter, the system continues 114, then waits for a rain event (or the continuation of the rain event) and takes rain measurements 106. If the counter is zero (True), normal operation of the traffic controller ensues, and calls are placed to the traffic controller as each car enters or is in the zone 118. Thereafter, the system continues 114, then waits for a rain event and takes measurements 106.

Figure 5:
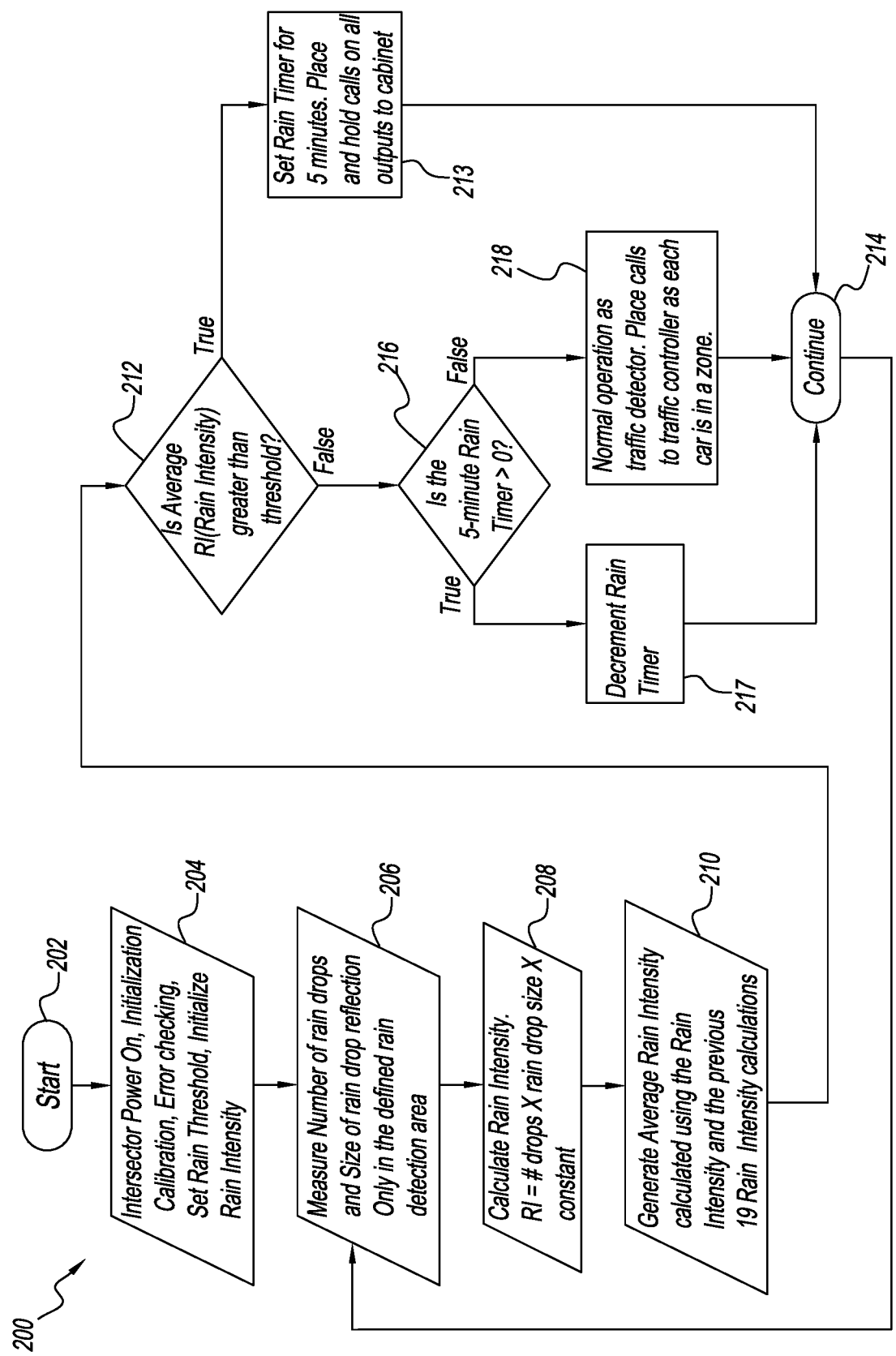
FIG. 5 is a flow chart of another manner of operation of the present signalized traffic control system with rain intensity determination using the radar camera of the signalized traffic control system in accordance with the principles of the present invention.

Another method of operating a signalized traffic control system with rain intensity detection is presented in the flowchart 200 of FIG. 5. The signalized traffic control system turns on with a Start 202. After Start 202, the Intersector (system) programming powers on, initializes, calibrates, error checks, sets a rain threshold, and initializes rain intensity programming 206. Thereafter, the radar camera is used to obtain measurement or data of the number of raindrops and raindrop size (via reflection) in order to calculate rain intensity (RI) by the formula RI=(# of raindrops)×(raindrop size)×(constant) 208. Average rain intensity is then calculated using the currently calculated rain intensity and a given number of previously calculated rain intensity values (e.g. 19 previously calculated rain intensity values) 210.

The average rain intensity is then compared to a rain intensity threshold (threshold) 212. If the rain intensity is greater than the threshold (True), then a rain intensity counter (counter) of a given interval (e.g. 5 minutes) is set 213, and calls on all outputs on the cabinet (traffic controller) are placed and held. Thereafter the system continues 214 which waits for a rain event (or the continuation of the rain event) and takes rain measurements 206. If the rain intensity is not greater than the threshold (False) the system determines if the rain intensity counter is greater than zero (0) 216. If the counter is not greater than zero (False), normal operation of the traffic control system ensues 218. Thereafter, the system continues 114, then waits for a rain event (or the continuation of the rain event) and takes rain measurements 106. If the counter is greater than zero (True), the rain timer and decremented 217. Thereafter, the system continues 114, then waits for a rain event (or the continuation of the rain event) and takes rain measurements 106.

Further to the method and the signalized traffic control system operation, the radar samples approximately twenty (20) times a second. From each sample a list of objects and radar properties may be created. In order to detect rain intensity, the radar is able to count the number of rain drops in the radar field of view in a short distance. The default range used is three (3) meters, or approximately ten (10) feet. In this range, the radar normally detects from 0 to 25 drops of rain depending on intensity.

Radar also has a property where the reflected signal strength can be corrected to show equivalent Radar Cross Section (RCS). For a rain drop this is close to the size of the raindrop, experiments and calculations have shown the RCS varies from ~0.010 inches to ~0.40 inches in diameter. With these two parameters, a new variable called Rain Intensity Factor (RIF) is created. This variable is the product of Average Rain Drops (ARD) and Average of Radar Cross Section. The average is taken over a 0.5 second interval to smooth out the value and provide more uniform results. Other intervals may be used.

Therefore, in one form, Rain Intensity=Average (Rain Drops)×(150-Average (Radar Cross Section in dB)). This new variable, Rain Intensity Factor, increases when either the number of rain drops increases or the size of the rain drops increases, which are directly correlated to increased rain intensity. From this, a customizable threshold can be set to specify the minimum rain intensity level to place a constant call to the traffic controller.

The reaction to increasing rain is instantaneous, as soon as the Rain Intensity value crosses the Threshold value a "RAIN" alert is activated. In addition to holding the call while RAIN is above the threshold, the radar will hold the call for additional 5 minutes after the rain has dropped below the threshold to ensure everything is operating normally again. This time is programmable and could be set to any value.

It should be appreciated that the components, structures, and/or features of the present invention may be altered as desired within the scope of the present disclosure.

What is claimed is:

1. A method of operating a signalized traffic control system having a radar camera, a traffic controller in communication with the radar camera, a computing device in communication with the radar camera, and a traffic signal in communication with the traffic controller, the method comprising the steps of:
sampling radar via the radar camera within a field of view range to determine if a vehicle is in the field of view range;
determining rain intensity within a range intensity measurement range by the computing device using the sampled radar from the radar camera, the rain intensity measurement range being different from the field of view range;
comparing by the computing device the determined rain intensity with a rain intensity threshold;
continuing normal operation of the traffic controller while the determined rain intensity is less than the rain intensity threshold; and
operating the traffic controller in a rain intensity mode while the determined rain intensity is above the rain intensity threshold.

2. The method of claim 1, further comprising the step of:
wherein the step of determining rain intensity includes the steps of:
counting raindrops within the rain intensity measurement range via the radar camera and computing device for a radar sampling; and
determining strength of rain reflection for the radar sampling;
the determination of rain intensity equaling the counted raindrops in the radar sampling times the determined size of rain reflection for the radar sampling times a rain intensity constant.

3. The method of claim 2, wherein the range intensity measurement range is a distance of 10 feet from the radar camera and the field of view range includes a portion of the road and a stop bar area up to a distance of 600 feet from the radar camera.

4. The method of claim 2, further comprising the step of:
starting a rain intensity counter when the determined rain intensity is greater than the rain intensity threshold.

5. The method of claim 1, wherein the rain intensity constant comprises determined radar cross section for the radar sampling.

6. The method of claim 5, wherein the radar cross section is determined by applying a correction factor to the rain reflection strength of the radar sampling.

7. The method of claim 1, further comprising the step of:
holding call to the traffic controller for a period of time after the rain intensity falls below the rain intensity threshold.

8. The method of claim 1, wherein the step of determining rain intensity includes the steps of:
determining a value for a number of raindrops within the rain intensity measurement range via the radar camera and computing device for a radar sampling; and
determining value for a size of the raindrops for the radar sampling;
wherein the rain intensity is based on the value for the number of raindrops and the value for the size of the raindrops.

9. A signalized traffic control system comprising:
a radar camera;
a traffic controller operably connected with the radar camera;
a computing device operably connected with the traffic controller;
memory associated with the computing device; and
program instructions stored in the memory and operative to:
sample radar via the radar camera within a field of view range to determine if a vehicle is in the field of view range;
determine rain intensity within a range intensity measurement range by the computing device using the sampled radar from the radar camera, the rain intensity measurement range being different from the field of view range;
compare by the computing device the determined rain intensity with a rain intensity threshold;
continue normal operation of the traffic controller while the determined rain intensity is less than the rain intensity threshold; and
operate the traffic controller in a rain intensity mode while the determined rain intensity is above the rain intensity threshold.

10. The signalized traffic control system of claim 9, wherein the memory stores program instructions that determines rain intensity by:
counting raindrops within the rain intensity measurement range via the radar camera and computing device for a radar sampling; and
determining strength of rain reflection for the radar sampling;
the determination of rain intensity equaling the counted raindrops in the radar sampling times the determined size of rain reflection for the radar sampling times a rain intensity constant.

11. The signalized traffic control system of claim 10, wherein the range intensity measurement range is a distance of 10 feet from the radar camera and the field of view range includes a portion of the road and a stop bar area up to a distance of 600 feet from the radar camera.

12. The signalized traffic control system of claim 10, wherein the memory stores program instructions that:
starts a rain intensity counter when the determined rain intensity is greater than the rain intensity threshold.

13. The signalized traffic control system of claim 9, wherein the rain intensity constant comprises determined radar cross section for the radar sampling.

14. The signalized traffic control system of claim 13, wherein the radar cross section is determined by applying a correction factor to the rain reflection strength of the radar sampling.

15. The signalized traffic control system of claim 9, wherein the memory stores program instructions that:
holds call to the traffic controller for a period of time after the rain intensity falls below the rain intensity threshold.

16. A method of detecting rain intensity with a traffic control system having a radar camera, a traffic controller in communication with the radar camera, and a computer programmed to:
sampling radar via the radar camera within a field of view range a to determine if a vehicle is in the field of view range;
determining rain intensity within a range intensity measurement range by the computing device using the sampled radar from the radar camera, the rain intensity measurement range being different from the field of view range;
determining an average rain intensity using the determined rain intensity and a given number of previously determined rain intensities;
comparing by the computing device the determined average rain intensity with a rain intensity threshold;
continuing normal operation of the traffic controller while the determined average rain intensity is less than the rain intensity threshold; and
operating the traffic controller in a rain intensity mode while the determined average rain intensity is above the rain intensity threshold.

17. The method of claim 16, wherein the given number of previously determined rain intensities equals nineteen.

18. The method of claim 16, wherein determining rain intensity includes:
counting raindrops within the rain intensity measurement range via the radar camera and computing device for a radar sampling; and
determining strength of rain reflection for the radar sampling;
the determination of rain intensity equaling the counted raindrops in the radar sampling times the determined size of rain reflection for the radar sampling times a rain intensity constant.

19. The method of claim 18, wherein the rain intensity constant comprises determined radar cross section for the radar sampling.

20. The method of claim 19, wherein the radar cross section is determined by applying a correction factor to the rain reflection strength of the radar sampling.

* * * * *